UNITED STATES PATENT OFFICE 2,479,883

PROCESS OF REACTIVATING A POISONED SILVER SURFACE CATALYST

Theo John West, Port Arthur, Tex., and James Pearson West, Chicago, Ill., assignors to Allied Chemical & Dye Corporation, a corporation of New York No Drawing. Application June 11, 1946, Serial No. 676,113

6 Claims. (Cl. 252—416)

This invention relates to the activation of catalysts, which have lost activity or become poisoned, for use in processes of making olefin oxides by the direct catalytic oxidation of olefins with oxygen.

Processes for oxidizing olefins directly to olefin oxides by means of oxygen in the presence of silver surface catalysts are well known. These catalysts, in use, become poisoned due to deleterious constituents introduced into contact with the catalysts by the olefin-air stream passed thereover. In the oxidation of ethylene to ethylene oxide, for example, the ethylene, which may be obtained by the cracking of petroleum fractions, may contain sulfur compounds, halogen compounds, and higher hydrocarbons, as impurities. The compressed air, admixed with the ethylene, may contain impurities, such as lubricating oil, derived from the air compressor and small amounts of sulfur and halogen compounds, particularly chlorine and chlorides. These impurities, in time, poison the catalyst, materially reducing its activity.

Among the objects of this invention is to provide a convenient and economical method for activating such silver surface catalysts which have become poisoned in use. Another object is to provide a process for activating silver surface catalysts, which process can be applied to the catalysts while in the catalyst converter, i. e., in the practice of the process it is not necessary to remove the catalyst from the converter, but the activation may be carried out without disturbing the catalyst in the converter. Other objects and advantages of this invention will be apparent from the following description thereof.

Silver surface catalysts are activated according to the present discovery by a treatment which involves passing ammonia over the catalyst, to restore the catalyst activity and efficiency. The reactivation may be effected by passing a stream of ammonia gas over the catalyst. The presence of oxygen in the ammonia gas has a beneficial effect in the removal of some poisons, for example, heavy hydrocarbons. Thus, this invention includes the reactivation of the catalysts in the presence of or in the absence of oxygen. Conveniently, the source of oxygen, if used, is air containing nitrogen as a natural diluent; the ammonia may be added to the air or other oxygen stream used to effect oxidation of the olefin and passed over the catalyst while the flow of the olefin is interrupted or the ammonia may be added to the olefin-oxygen stream and the activation carried out in the presence of the olefin and the oxidation reaction products.

The amount of ammonia added to the gas stream to effect reactivation may vary within wide limits; from about 1 to about 6 mol percent is preferred. Employing air to supply the oxygen, the ammonia may be incorporated in the air stream by passing the air through an ammonium hydroxide solution, prior to passage over the catalyst, or by adding anhydrous ammonia to the air in the desired proportion.

The activation treatment is preferably carried out under the pressure and temperature conditions prevailing in the converter. Silver surface catalysts, used in catalyzing the ethylene to ethylene oxide reaction, and made by depositing silver oxide on an Alundum support, which catalysts are hereinafter described in greater detail in connection with the examples, should be reactivated at a temperature not exceeding about 325° C., for example, at a temperature of from 170° to 325° C., preferably within the range of from about 260° to 280° C. For more thermally stable silver surface catalysts, the reactivation may be carried out at higher temperatures.

The amount of ammonia passed over the catalyst to be activated, the rate of feed and the time of treatment, will vary, depending upon the nature of the catalyst treated, the character of the poisons, the size of the catalyst converter, etc. In general, treatment should be continued with a sufficient volume of ammonia, as above disclosed, until the activity of the catalyst has been restored. This can readily be determined by testing a sample of the catalyst which has been activated to determine its activity. As above indicated, the activation may be conveniently carried out by simply adding the ammonia to the air stream employed to support oxidation of the olefin, with or without interrupting the flow of the olefin over the catalyst and without removing the mass of catalyst from the converter.

This invention has been found particularly effective for the activation of silver surface catalysts which have become poisoned, for example, due to halogens, sulfur or heavy hydrocarbons.

while the reason for the activation of the silver surface catalysts thus poisoned is not positively known, it is believed reaction takes place between the ammonia and those materials which tend to poison the catalyst, to form compounds which are volatile or otherwise removable from the catalyst, and in the continued flow of the ammonia stream over the catalyst, such removal is effected. The oxygen, if present, as above noted, has a beneficial effect in the removal of some poisons, such, for example, as heavy hydrocarbons. It is further believed that reaction takes place between the ammonia and portions of the silver surface, which portions have previously been attacked, for example, by chlorine and lost their activity to form new catalyst contact points, thereby activating these portions. Although there is good reason to believe the activation proceeds according to the theory set forth above, it is understood this invention is not to be limited by any statements of theory or explanation. The invention consists of the step of passing an ammonia stream with or without oxygen over a poisoned silver surface catalyst to activate it.

Water vapor may be added to the ammonia oxygen stream employed to effect the reactivation. The larger the concentration of the ammonia in the gas stream employed to effect the reactivation, the larger the quantity of water vapor which should be added to this gas stream. Preferably, about 6 mols of water vapor are added per mol ammonia in the activating gas stream. The addition of water vapor to the ammonia oxygen stream used to effect activation, it has been found, results in uniform activation of the catalyst throughout the whole bed. The water vapor moderates the reaction between the ammonia and oxygen on the one hand, and the poisons, impurities and silver surface on the other, preventing overheating of the inlet end of the catalyst bed and resulting in more uniform activation of the catalyst throughout the whole length and cross-sectional area of the bed. Furthermore, ammonia itself is oxidized over the catalyst in the presence of oxygen. The presence of water vapor moderates this reaction and causes the ammonia and oxygen to more effectively activate the catalyst. The use of water vapor is particularly desirable when activating relatively long catalyst beds maintained in tubes of relatively large diameter in which heat transfer from the catalyst to the temperature control medium is not readily accomplished.

Activation, according to this invention, may be applied to all forms of silver surface catalyst used for catalyzing the oxidation of olefins to olefin oxides, particularly ethylene to ethylene oxide. Silver surface catalysts, which are desirably maintained on catalyst supports such as silica, fused alumina refractory materials, and zirconium oxide, including, but without limitation, Tabular Corundum, Alusite, and Alundum, crushed and screened to a convenient size, may be reactivated by the process of the invention. The activation procedure may be applied to silver surface catalysts which have been promoted, for example, by the incorporation therein of the oxides, hydroxides or peroxides of barium, lithium or strontium, or by the addition of promotive metals such as gold or copper. It may be applied to the activation of silver surface catalysts produced by co-precipitating silver oxide and silver halides such as silver chloride, bromide, iodide or fluoride, the latter constituent acting as a promoter, and reducing the co-precipitated silver compounds with ammonia at an elevated temperature, the subject of our copending application, Serial No. 676,116 filed June 11, 1946, now U. S. Patent No. 2,463,228, issued March 1, 1949. Such co-precipitated silver surface catalysts should contain from .03 to .3 percent silver halide by weight of silver oxide, when the silver compounds are co-precipitated, for optimum results.

In use the silver oxide catalysts are reduced to silver in the presence of the normal reacting gases, e. g. ethylene and oxygen. This reduction of the catalysts employed to catalyze the oxidation of ethylene to ethylene oxide desirably is accomplished during the initial stages of the operation of the catalyst converter, i. e. the "breaking-in" period when the catalyst bed is maintained at about 200° C. for several hours before heating the catalyst to the optimum running temperature.

In the examples which follow, the catalyst used was prepared by taking desired amounts of carrier, (the particular carrier used is given in the description of the example), ground silver oxide, and sufficient water to form a thick slurry with the silver oxide and stirring the mixture until the carrier was well-coated with the silver oxide. The wet catalyst was then dried in an oven at about 85° C.

The supported catalyst was placed in a jacketed converter surrounded by boiling heat transfer medium consisting of a mixture of diphenyl and diphenyl oxide.

The technique followed was to flow a mixture of oxygen, ethylene and inert gas (nitrogen) over the catalyst, in the converter, in the proportions and at the space velocity indicated in connection with each example; the average temperature of the catalyst during the runs is indicated in the tables which follow. Samples of the reaction products were taken and analyzed to determine their ethylene oxide and carbon dioxide content; from these values the percent attack, percent efficiency and percent conversion given in the tables were calculated. In the tables which follow, the figures under the column heading "Time Hours" represent the number of hours, after the commencement of the example in question, at which the reaction products were sampled and analyzed, as hereinabove described.

By "space velocity" as used herein, is meant the volumes of total gas (at standard conditions of 0.° C. and 760 mm. of mercury pressure) passed over the body of catalyst per hour, per volume of catalyst body. By "percent attack" is meant the mols of ethylene converted to carbon dioxide and ethylene oxide $\times 100$, divided by the mols of ethylene passed over the catalyst. By "percent conversion" is meant percent ethylene converted to ethylene oxide per pass through the converter. By "percent efficiency" is meant the number of mols of ethylene converted to ethylene oxide $\times 100$, divided by the number of mols of ethylene converted to ethylene oxide and carbon dioxide. The term "activation" is used in a broad sense and includes reactivation of catalysts which have partially or completely lost their activity.

In the examples, unless otherwise indicated, the percent values are volume percents.

EXAMPLE 1

In this example, the catalyst used was made by depositing one part of silver oxide on eight parts of 8 to 10 mesh Alundum; a mixture containing 20% oxygen, from 2.1 to 2.4% ethylene, and the rest nitrogen, was passed over the catalyst at a space velocity of 435.

Table I

| Run | Average Catalyst T., °C. | Time, Hours | Percent Attack | Percent Efficiency | Percent Conversion |
|---|---|---|---|---|---|
| 1 | 261 | 5 | 65.6 | 60.6 | 39.8 |
| 2 | 260 | 26 | 56.3 | 56.3 | 37.4 |
| 3 | 260 | 54 | 8.5 | 74.2 | 6.3 |
| 4 | 260 | 76 | 20.6 | 61.0 | 12.5 |
| 5 | 261 | 99 | 13.5 | 66.6 | 8.1 |
| 6 | 259 | 124 | 46.8 | 53.1 | 24.8 |
| 7 | 259 | 147 | 64.4 | 50.8 | 32.7 |
| 8 | 260 | 153 | 74.9 | 50.3 | 37.7 |
| 9 | 260 | 225 | 65.9 | 55.6 | 36.6 |

Between runs 4 and 5, an attempt was made to revivify the catalyst by passing steam and air thereover for 4.75 hours. It will be noted the steam air treatment was ineffective.

Between runs 5 and 6, the activation treatment of the invention was applied to the catalyst; 6 mol percent ammonia was added to the oxygen-nitrogen stream, and this mixture passed over the catalyst for 45 minutes. The ethylene flow was shut off during the flow of the oxygen-nitrogen-ammonia mixture over the catalyst and upon the completion of this reactivation treatment, the flow of ethylene, oxygen and nitrogen over the catalyst was resumed.

This ammonia reactivation treatment was repeated between runs 6 and 7 and was again applied between runs 7 and 8 for 20 minutes.

In the reactivation treatments above described, the ammonia was introduced into the oxygen-nitrogen stream by passing the oxygen and nitrogen through a 3N ammonium hydroxide solution at 30° C. Water vapor was thus introduced into the oxygen-nitrogen-ammonia stream, which water vapor was found to have a beneficial effect in moderating the reaction between the oxygen, ammonia and catalyst poisons, minimizing the formation of hot spots in the body of catalyst.

From the above Table I, it will be noted that as a result of the three ammonia-oxygen activation treatments, the activity of the catalyst was materially improved; thus the percent attack increased from 13.5 before the initial ammonia-oxygen activation treatment to 74.9 after the last of the three treatments, and the percent conversion of ethylene to ethylene oxide per pass through the converter increased from 8.1 to 37.7.

EXAMPLE 2

The catalyst used in this example was of the same type as that used in Example 1. A mixture containing 20% oxygen from 2.3 to 2.6% ethylene and the rest nitrogen was passed over the catalyst at a space velocity of 870.

Table II

| Run | Average Catalyst T., °C. | Time, Hours | Percent Attack | Percent Efficiency | Percent Conversion |
|---|---|---|---|---|---|
| 1 | 261 | 70 | 59.4 | 40.5 | 24.1 |
| 2 | 261 | 95 | 49.9 | 48.9 | 24.4 |
| 3 | 261 | 116 | 48.4 | 50.6 | 24.4 |
| 4 | 261 | 138 | 48.4 | 50.7 | 24.4 |
| 5 | 261 | 168 | 19.2 | 59.7 | 11.5 |
| 6 | 261 | 193 | 29.4 | 54.4 | 15.9 |
| 7 | 260 | 212 | 17.1 | 55.6 | 9.5 |
| 8 | 260 | 217 | 27.5 | 53.2 | 14.6 |
| 9 | 260 | 245 | 26.6 | 61.1 | 16.3 |
| 10 | 261 | 268 | 46.0 | 43.0 | 19.8 |
| 11 | 261 | 300 | 58.5 | 38.8 | 22.7 |
| 12 | 261 | 322 | 50.1 | 42.6 | 21.7 |
| 13 | 261 | 340 | 49.6 | 49.2 | 24.4 |
| 14 | 260 | 368 | 51.2 | 44.4 | 22.7 |
| 15 | 260 | 390 | 48.7 | 44.0 | 21.4 |
| 16 | 260 | 398 | 47.0 | 43.6 | 20.5 |
| 17 | 272 | 424 | 59.4 | 40.9 | 24.3 |
| 18 | 262 | 443 | 55.2 | 52.8 | 29.1 |

Between runs 6 and 7, the flow of ethylene was interrupted and the oxygen and nitrogen stream containing 20% oxygen passed over the catalyst for 16.75 hours. From the data on run 7, it will be noted this treatment did not restore the activity of the catalyst.

Between runs 7 and 8, the flow of oxygen and nitrogen was interrupted and the flow of ethylene continued for one and a quarter hours. This treatment restored activity of the catalyst slightly.

Between runs 9 and 10, the reactivation treatment of the invention was applied to the catalyst; 6 mol percent ammonia was added to the oxygen-nitrogen stream and the resultant gas mixture passed over the catalyst for 30 minutes, while interrupting the flow of ethylene; the flow of the oxygen-nitrogen-ethylene stream over the catalyst was resumed at the end of this 30-minute period.

Between runs 12 and 13, and again between runs 16 and 17, the ammonia activation treatment was repeated.

It will be noted that the reactivation treatment of the invention resulted in an increase in the percent attack from 26.6 to 59.4 and in the percent conversion per pass from 16.3 to 24.3.

EXAMPLE 3 (PART 1)

This example demonstrates the effectiveness of the activation treatment of this invention, to remove sulfur poisons from the catalyst. The catalyst used in this example consisted of one part (by weight) silver oxide per eight parts of Alundum. A mixture containing 20% oxygen, 2.1 to 2.5% ethylene and the rest nitrogen was passed over the catalyst at a space velocity of 870.

Table III (a)

| Run | Average Catalyst T., °C. | Time, Hours | Percent Attack | Percent Efficiency | Percent Conversion |
|---|---|---|---|---|---|
| 1 | 261 | 15 | 67.8 | 46.5 | 31.5 |
| 2 | 262 | 42 | 67.8 | 48.3 | 32.8 |
| 3 | 261 | 48 | 67.5 | 49.0 | 33.1 |
| 4 | 261 | 98 | 47.3 | 40.2 | 19.0 |
| 5 | 262 | 116 | 59.8 | 49.7 | 29.8 |
| 6 | 261 | 120 | 72.0 | 47.3 | 34.1 |

Between runs 3 and 4, 37 volumes of amyl mercaptan per million volumes of oxygen, nitrogen and ethylene were introduced into the oxygen-nitrogen-ethylene stream passed over the catalyst, and this flow continued for a half hour.

It will be noted from the data on run 4 that the sulfur treatment resulted in a poisoning of the catalyst in that the percent attack was reduced from 67.5 to 47.3, the percent efficiency from 49 to 40.2 and the percent conversion from 33.1 to 19.

The ammonia activation treatment of this invention was applied between runs 4 and 5; 6 mol percent ammonia was introduced into the oxygen-nitrogen stream and the gas mixture passed for one hour over the catalyst, while interrupting the flow of ethylene; immediately after this one-hour treatment, the flow of ethylene, along with oxygen and nitrogen, was resumed. Between runs 5 and 6 this ammonia activation treatment was repeated; the time of flow of the ammonia-oxygen-nitrogen stream over the catalyst was one and a half hours, and immediately thereafter the flow of oxygen, nitrogen and ethylene over the catalyst was resumed.

It will be noted, the ammonia activation treatment completely restored the activity of the catalyst in that after the second treatment, the catalyst gave a percent attack of 72, as compared with 67.5 before the sulfur poisoning and a percent conversion of 34.1 as compared with 33.1.

EXAMPLE 3 (PART 2)

The catalyst used in this example consisted of one part silver oxide, containing .11% (by weight) silver chloride with respect to the silver oxide and 8 parts Alundum. The catalyst was prepared by co-precipitating the silver oxide and silver chloride by treatment of silver nitrate with barium hydroxide containing an amount of sodium chloride to produce the desired amount of silver chloride relative to the silver oxide, washing the co-precipitated silver compounds with water to remove impurities, and then forming a paste with water, intimately mixing the paste with the carrier and drying. The supported catalyst was reduced, before use, by passage thereover of an air stream containing 6 mol percent ammonia and 6 mol percent water vapor for 17 hours at 200° C.

A gas mixture containing 20% oxygen, between 2.2 and 2.3 percent ethylene and the rest nitrogen, was passed over the catalyst at a space velocity of 870.

*Table III (b)*

| Run | Average Catalyst T., °C. | Time, Hours | Percent Attack | Percent Efficiency | Percent Conversion |
|---|---|---|---|---|---|
| 1 | 261 | 6 | 84.8 | 51.2 | 43.4 |
| 2 | 260 | 30 | 77.4 | 50.3 | 38.9 |
| 3 | 260 | 92 | 73.3 | 51.5 | 37.7 |
| 4 | 260 | 114 | 77.0 | 52.0 | 40.0 |
| 5 | 260 | 155 | 79.3 | 49.0 | 38.8 |
| 6 | 260 | 176 | 53.6 | 64.8 | 34.7 |
| 7 | 260 | 277 | 86.9 | 52.2 | 45.4 |
| 8 | 260 | 353 | 87.4 | 49.4 | 43.2 |

Between runs 1 and 2, 37 volumes of amyl mercaptan per million volumes of oxygen, nitrogen and ethylene were introduced into the oxygen-nitrogen-ethylene stream passed over the catalyst, and the flow of this mixture over the catalyst continued for 37 minutes. It will be noted from the data on run 2 that this treatment resulted in a partial poisoning of the catalyst in that it reduced the percent attack from 84.8 to 73.3 and the percent conversion from 43.4 to 37.7.

Between runs 3 and 4, the activation treatment of the invention was applied by introducing into the oxygen-nitrogen stream passing over the catalyst, 6 mol percent ammonia and 6 mol percent water. This activation treatment was continued for a period of two hours.

Between runs 5 and 6, .05 mol percent ethylene dichloride was introduced into the ethylene-oxygen-nitrogen stream passing over the catalyst, and the flow of the resultant gas mixture over the catalyst continued for five minutes; thereafter, the flow of ethylene was interrupted and an oxygen-nitrogen stream containing 6 mol percent ammonia and 6 mol percent water vapor passed over the catalyst for two hours.

From the data on runs 7 and 8, it will be evident that the above-described treatment activated the catalyst.

EXAMPLE 4

This example demonstrates the effectiveness of the activation procedure of this invention to activate a catalyst which has been poisoned by contact with nitric acid vapors.

In this example, the catalyst used was made by depositing one part of silver oxide on 8 parts of Alusite. A mixture containing 20% oxygen, 2.1 and 2.3% ethylene and the rest nitrogen was passed over the catalyst at a space velocity of 870.

*Table IV*

| Run | Average Catalyst T., °C. | Time, Hours | Percent Attack | Percent Efficiency | Percent Conversion |
|---|---|---|---|---|---|
| 1 | 261 | 27 | 58.6 | 41.2 | 24.2 |
| 2 | 261 | 30 | 21.4 | 37.6 | 8.0 |
| 3 | 260 | 47 | 27.2 | 49.3 | 13.4 |
| 4 | 259 | 75 | 45.5 | 47.3 | 21.5 |
| 5 | 261 | 117 | 48.7 | 55.1 | 26.8 |
| 6 | 260 | 144 | 51.4 | 52.7 | 27.1 |
| 7 | 261 | 169 | 52.7 | 63.8 | 33.6 |
| 8 | 259 | 188 | 66.9 | 61.0 | 40.8 |
| 9 | 258 | 264 | 72.0 | 54.6 | 39.3 |

Between runs 1 and 2, 30 cc. of nitric acid per minute were passed over the catalyst for 15 minutes, the nitric acid being added to the stream of ethylene, oxygen and nitrogen passed over the catalyst. This treatment, it will be noted, resulted in poisoning of the catalyst in that it reduced the percent attack from 58.6 to 21.4, the percent efficiency from 41.2 to 37.6 and the percent conversion from 24.2 to 8.

The activation treatment of the invention was applied between runs 3 and 4; 6 mol percent of ammonia was introduced into the oxygen-nitrogen stream and the resultant gas mixture passed over the catalyst for 45 minutes, the flow of ethylene being interrupted during this period.

Between runs 6 and 7, a second activation treatment was given to the catalyst. In this treatment, .05 mol percent ethylene dichloride was passed over the catalyst for five minutes in admixture with the ethylene-oxygen-nitrogen stream. Thereafter, 6 mol percent ammonia was added to the oxygen-nitrogen stream and the resultant mixture passed through the catalyst, the flow of ethylene being interrupted during the ammonia-oxygen treatment. Between runs 7 and 8, the ammonia treatment was repeated, 6 mol percent ammonia being added to the oxygen-nitrogen stream, and this stream passed over the catalyst for 45 minutes, the flow of ethylene being interrupted, its flow being resumed at the end of this 45-minute period.

It will be noted that the activation treatment above described served to completely restore the activity of the catalyst which had been poisoned by the nitric acid treatment; the percent attack after the oxygen-ammonia treatment was 66.9 as compared with a percent attack of 58.6 before the treatment with nitric acid and 21.4 after the nitric acid treatment, the percent efficiency was 61 as compared with 41.2 and 37.6 before and after the nitric acid treatment, and the percent conversion 40.8 as compared with 24.2 and 8.0 before and after the nitric acid treatment.

EXAMPLE 5

This example demonstrates the effectiveness of the activation procedure of this invention to activate a halogen poisoned catalyst. In this example, the catalyst used was of the same type as that employed in Example 1. A gas mixture containing 20 percent oxygen, from 2.6 to 2.7% ethylene and the rest nitrogen, was passed over the catalyst at a space velocity of 870.

Table V

| Run | Average Catalyst T., °C. | Time, Hours | Percent Attack | Percent Efficiency | Percent Conversion |
|---|---|---|---|---|---|
| 1 | 261 | 75 | 63.5 | 36.5 | 23.0 |
| 2 | 259 | 102 | | No Attack. | |
| 3 | 260 | 105 | 59.6 | 55.4 | 33.0 |
| 4 | 260 | 123 | 66.0 | 64.4 | 42.5 |

Between runs 1 and 2, .05 mol percent ethylene dichloride was added to the ethylene-oxygen-nitrogen stream passed over the catalyst and the flow of the resultant gas stream over the catalyst continued for five minutes. From the data in the above table on run 2, it will be evident that this treatment inactivated the catalyst.

The activation procedure of the invention was applied to the catalyst between runs 2 and 3, 6 mol percent of ammonia was added to the oxygen-nitrogen stream and the resultant gas mixture passed over the catalyst for one hour, the flow of ethylene being interrupted during the flow of the ammonia containing gas over the catalyst.

From run 4, it will be evident that the ammonia activation treatment completely restored the activity and efficiency of the catalyst.

EXAMPLE 6

This example demonstrates the effectiveness of the activation procedure of this invention to activate catalysts which have been poisoned by lubricating oil.

The catalyst used in this example was of the same type as that used in Example 1. A mixture containing 20% oxygen, from 2 to 2.3% ethylene, and the rest nitrogen was passed over the catalyst at a space velocity of 870.

Table IV

| Run | Average Catalyst T., °C. | Time, Hours | Percent Attack | Percent Efficiency | Percent Conversion |
|---|---|---|---|---|---|
| 1 | 262 | 11 | 59.4 | 54.4 | 32.3 |
| 2 | 262 | 19 | 51.7 | 62.7 | 32.3 |
| 3 | 262 | 48 | 53.2 | 60.4 | 32.1 |
| 4 | 262 | 66 | 51.8 | 53.5 | 27.7 |
| 5 | 261 | 156 | 50.8 | 61.1 | 31.0 |
| 6 | 262 | 241 | 43.7 | 55.1 | 24.1 |
| 7 | 261 | 304 | 48.2 | 50.9 | 24.5 |
| 8 | 262 | 375 | 33.5 | 42.7 | 14.3 |
| 9 | 262 | 396 | 30.1 | 46.5 | 14.0 |
| 10 | 262 | 495 | 40.5 | 39.2 | 15.9 |
| 11 | 262 | 501 | 24.0 | 61.6 | 14.8 |
| 12 | 261 | 541 | 43.9 | 65.6 | 28.8 |
| 13 | 262 | 561 | 41.1 | 55.4 | 22.8 |
| 14 | 262 | 637 | 53.8 | 47.0 | 25.2 |
| 15 | 262 | 681 | 54.8 | 48.8 | 26.5 |

Between runs 1 and 2, the ethylene-oxygen-nitrogen stream was passed through SAE-30 lubricating oil maintained at 100° C. During runs 2 to 8 inclusive the oxygen-nitrogen-ethylene stream continued to flow through the lubricating oil prior to passing over the catalyst, thus introducing oil vapor into contact with the catalyst. It will be noted that as a result of this oil vapor brought into contact with the catalyst, the percent attack decreased from 59.4 to 33.5, percent efficiency from 54.4 to 42.7, and the percent conversion from 32.3 to 14.3. The flow of the ethylene-oxygen stream through the oil was discontinued one hour after the completion of run 8, and the flow of ethylene, oxygen and nitrogen over the catalyst continued for 20 hours, at which point the reaction products were analyzed and the data given in the above table under run 9 calculated from the analysis. From the data on run 9 in the above table, it is evident the catalyst remained in a partially poisoned condition.

The activation treatment of this invention was applied between runs 9 and 10; 6 mol percent ammonia and 6 mol percent water vapor were added to the oxygen-nitrogen stream, the flow of ethylene being interrupted and the resultant ammonia-oxygen-nitrogen water-vapor stream passed over the catalyst for two hours. Between runs 10 and 11, a second reactivation treatment was given to the catalyst. In this treatment, 0.5 mol percent ethylene dichloride was added to the ethylene-oxygen-nitrogen stream, and the resultant mixture passed for five minutes over the catalyst. The flow of ethylene was then interrupted and 6 mol percent ammonia and 6 mol percent water vapor added to the oxygen-nitrogen stream, and the resultant mixture passed over the catalyst for two hours.

From the above table, it will be noted that the reactivation procedure of this invention reactivated the catalyst which had been poisoned by lubricating oil.

EXAMPLE 7

This example demonstrates the effectiveness of the process of this invention to reactivate a catalyst which has been poisoned by the aforesaid heat transfer medium consisting of a mixture of diphenyl and diphenyl oxide.

The catalyst used in this example was the same as that used in the preceding example. A mixture containing 20% oxygen from 1.9 to 2.3% ethylene and the rest nitrogen was passed over the catalyst at a space velocity of 870.

Table VII

| Run | Average Catalyst T., °C. | Time, Hours | Percent Attack | Percent Efficiency | Percent Conversion |
|---|---|---|---|---|---|
| 1 | 262 | 44 | 54.8 | 48.8 | 26.5 |
| 2 | 261 | 49 | 21.1 | 60.5 | 12.7 |
| 3 | 261 | 67 | 14.6 | 59.9 | 8.7 |
| 4 | 261 | 112 | 45.7 | 43.5 | 19.9 |
| 5 | 263 | 163 | 51.7 | 56.6 | 29.3 |
| 6 | 262 | 212 | 54.0 | 48.6 | 26.4 |
| 7 | 262 | 217 | 52.3 | 48.4 | 25.3 |
| 8 | 262 | 235 | 53.8 | 48.8 | 26.3 |

Between runs 1 and 2, the ethylene-oxygen-nitrogen stream was passed through the aforesaid heat transfer medium at 25° C. before passage over the catalyst and this flow of the reactant gases was continued during runs 2 and 3, the flow of the reactant gases through the heat transfer medium being discontinued at the end of run 3. It will be noted that the introduction of the heat transfer medium into contact with the catalyst resulted in a reduction of the percent attack from 54.8 to 14.6 and the percent conversion from 26.5 to 8.7.

Between runs 3 and 4, the reactivation treatment of this invention was applied; the flow of ethylene was interrupted and 6 mol percent ammonia and 6 mol percent water vapor introduced into the oxygen-nitrogen stream and the resultant gas mixture passed over the catalyst for two hours.

From the data on runs 4 to 8 inclusive, it will be evident that the ammonia-oxygen treatment reactivated the catalyst.

The expression "oxidation of olefins to olefin oxides" is used in the specification and claims to include the oxidation of a single olefin, e. g., ethylene to ethylene oxide, as well as the oxidation of a mixture of olefins.

Since certain changes may be made in carrying out the above process without departing from the scope of the invention, it is intended that all matter contained in the above description shall be interpreted as illustrative and not in a limiting sense.

What is claimed is:

1. The process of reactivating a poisoned silver surface catalyst employed to catalyze the oxidation of olefins to olefin oxides, which comprises passing a stream of ammonia and water vapor over said catalyst at a temperature of from 170° to 325° C.

2. The process of reactivating a poisoned silver surface catalyst as defined in claim 1, in which the temperature of the catalyst is from 260° to 280° C. during the passage of the stream of ammonia and water vapor thereover.

3. The process of reactivating a poisoned silver surface catalyst employed to catalyze the oxidation of olefins to olefin oxides, which comprises passing over said catalyst at a temperature of from 170° to 325° C., a stream of oxygen, ammonia and water vapor.

4. The process of reactivating a poisoned silver surface catalyst as defined in claim 3, in which the catalyst is at a temperature of from 260° to 280° C. during the passage of the stream of oxygen, ammonia and water vapor thereover, and the said stream contains about 6 mols of water vapor per mol of ammonia.

5. The process of revivifying a poisoned silver surface catalyst employed to catalyze the oxidation of ethylene to ethylene, oxide, which comprises passing a stream of ammonia and water vapor over a body of said catalyst at a temperature of from 170° to 325° C.

6. The process of revivifying a poisoned silver surface catalyst as defined in claim 5, in which the stream of ammonia and water vapor contains about 6 mols of water vapor per mol of ammonia and the temperature of the body of catalyst is from 260° to 280° C. during the passage of said stream of ammonia and water vapor thereover.

THEO JOHN WEST.
JAMES PEARSON WEST.

REFERENCES CITED

The following references are of record in the file of this patent:

UNITED STATES PATENTS

| Number | Name | Date |
| --- | --- | --- |
| 1,483,412 | Clancy | Feb. 12, 1924 |
| 1,483,414 | Clancy | Feb. 12, 1924 |

FOREIGN PATENTS

| Number | Country | Date |
| --- | --- | --- |
| 397,161 | Great Britain | Aug. 3, 1933 |